United States Patent [19]

Escue

[11] 4,215,870
[45] Aug. 5, 1980

[54] ROTATABLE SHAFT SEAL

[76] Inventor: Jesse W. Escue, 314 Nicholson, Joliet, Ill. 60435

[21] Appl. No.: 965,822

[22] Filed: Dec. 4, 1978

[51] Int. Cl.³ .............................................. F16J 15/34
[52] U.S. Cl. ................................................. 277/93 R
[58] Field of Search .......... 277/93, 81 R, 197, 93 SD, 277/87, 88

[56] References Cited

U.S. PATENT DOCUMENTS

| | | |
|---|---|---|
| 1,062,438 | 5/1913 | Clark . |
| 1,167,210 | 1/1916 | Orr .......................................... 277/93 |
| 2,252,526 | 8/1941 | Shenton . |
| 2,354,478 | 7/1944 | Reinhardt et al. . |
| 2,455,539 | 12/1948 | Wahl . |
| 2,996,319 | 8/1961 | Copes ..................................... 277/93 |
| 3,072,414 | 1/1963 | Porges . |
| 3,313,550 | 4/1967 | Culman . |
| 3,391,942 | 7/1968 | Wilson .................................. 277/93 |
| 3,529,839 | 12/1970 | Greiner et al. . |
| 3,589,738 | 6/1971 | Tracy ................................. 277/93 R |

FOREIGN PATENT DOCUMENTS 489486 8/1925 Fed. Rep. of Germany ............. 277/93

*Primary Examiner*—Robert I. Smith
*Attorney, Agent, or Firm*—Hosier, Niro & Daleiden, Ltd.

[57] ABSTRACT

A sealing assembly is disclosed for effecting a sealing joint between relatively rotatable elements which include a stationary element and a rotatable shaft passing through the stationary element. The sealing assembly includes a stationary seal integral with or secured to the stationary element, the stationary seal having an annular sealing surface surrounding the rotatable shaft. A rotatable seal ring surrounds the shaft and has an annular sealing surface for engaging and cooperating with the annular sealing surface of the stationary seal to establish a seal therebetween. A rotatable collar is secured to the shaft for rotation therewith, and at least one selectively adjustable spring assembly is mounted on the collar for biasing the seal ring against the stationary seal to effect the sealing joint. The spring assembly includes a plunger, a pair of coil springs of different spring coefficients for biasing the plunger toward the seal ring, and an adjusting nut on the collar for selectively adjusting the biasing force of the coil springs.

27 Claims, 4 Drawing Figures

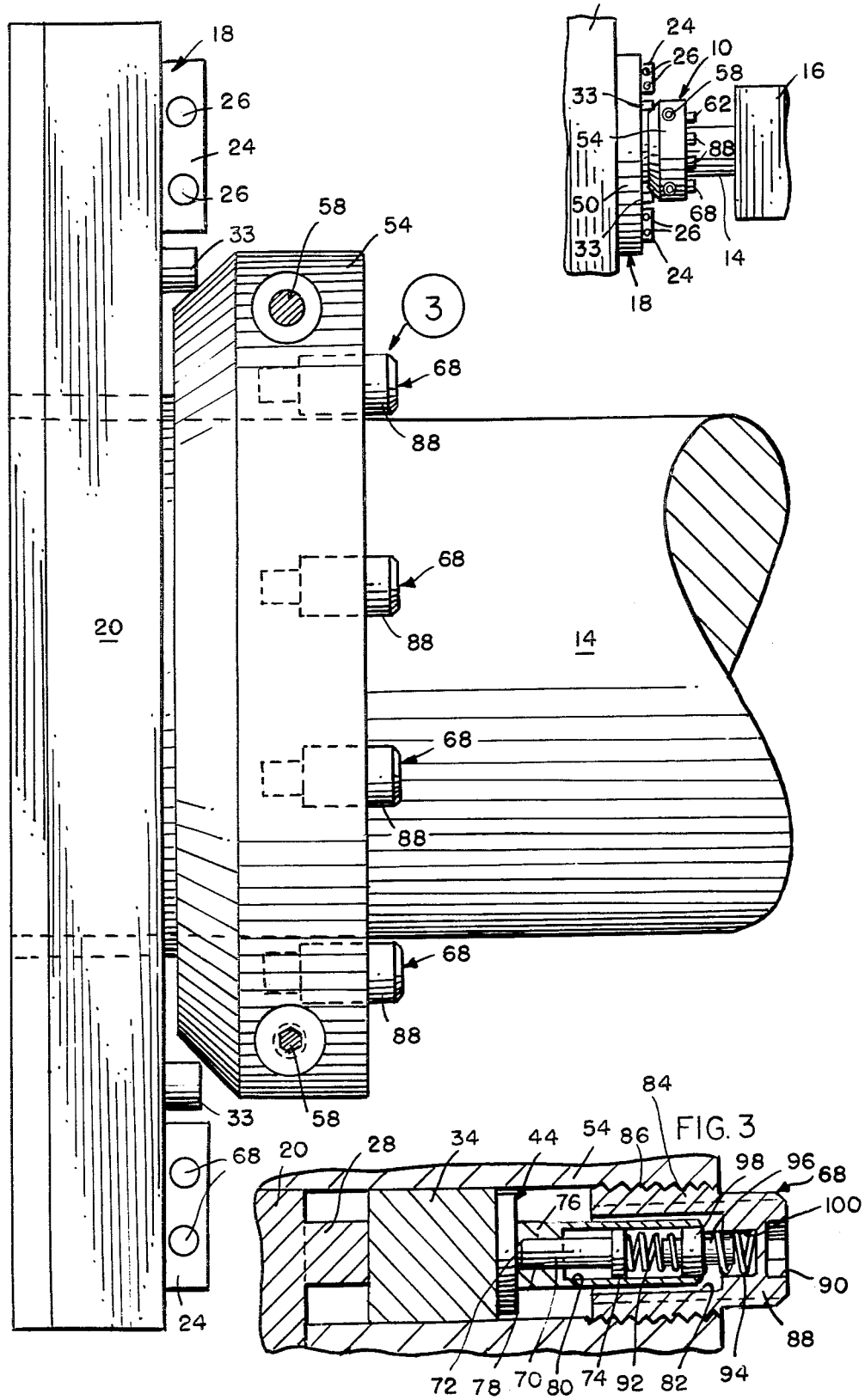

ROTATABLE SHAFT SEAL

BACKGROUND OF THE INVENTION

This invention relates to a shaft seal and, more particularly, to a sealing assembly for effecting a sealing joint between relatively rotatable elements which include a stationary element and a rotatable shaft passing through the stationary element.

It continuously is a problem to seal the opening in a wall or the like of various types of machinery through which a rotatable shaft protrudes in such a manner as to prevent leakage or loss of pressure and at the same time to avoid undue shaft friction which generates heat, causes loss of power and may even lead to injury to the shaft or the associated machinery, or both. One method of effecting a seal at a joint between a stationary element and a rotatable shaft has been through the use of packing, stuffing, or the like. However, packing or stuffing causes considerable friction on the shaft. The present invention is directed to a sealing assembly which does not utilize packing or stuffing and thereby eliminates the friction caused thereby so that the rotatable shaft can operate at faster speeds while also adding to the operative life of the shaft. Other sealing joints have utilized O-rings. However, it always is a problem in providing a proper material for the O-rings due to the wear thereon when utilized with shafts that operate at high speeds. These problems are of particular magnitude in the chemical industry or the nuclear field where very efficient seals must be provided between stationary and rotatable members which cannot be provided by packing or stuffing materials. Shaft speeds often range in the area of 3,600 r.p.m.'s or greater.

In certain applications, particularly where the machinery or equipment which is being sealed in large and heavy, or where it would be particularly inconvenient for other reasons for the equipment to be stripped or dismantled to replace conventional mechanical seals, it is desirable that the parts of the mechanical seals which are subject to wear be split so that they can be easily mounted about the shaft and readily disassembled therefrom for repair or replacement purposes. The features of the present invention are particularly adapted for use in a split-type seal which can be easily assembled about the rotatable shaft and disassembled therefrom without interfering with the positioning or mounting of the rotatable shaft as well as the stationary element with which it is associated.

In addition, it is a problem with seals of the character described to maintain a complete seal at all times completely about the rotatable shaft. During operation, the seals become worn or deteriorated and the wear and deterioration often times is non-uniform circumferentially about the shaft. This is true because of many reasons such as misalignment of the rotatable shaft with respect to the stationary machinery or equipment with which it is used, or due to other factors. It is highly desirable to provide a sealing assembly for the rotatable shaft which is selectively adjustable angularly or circumferentially about the shaft so as to accommodate non-uniform wearing or deterioration of the seal parts, such as the sealing ring.

This invention is directed to solving the above and other problems while providing a new and improved seal of the character described not heretofore available.

SUMMARY OF THE INVENTION

Accordingly, it is a principal object of this invention to provide a new and improved shaft seal and, more particularly, a sealing assembly for effecting a sealing joint between relatively rotatable elements which include a stationary element and a rotatable shaft passing through the stationary element.

In the exemplary embodiment, stationary seal means is provided in the form of a circular stationary hub formed integral with or mounted on a plate which, in turn, is capable of being fixed to a wall or the like of appropriate machinery or equipment with which the sealing assembly of the present invention is to be utilized. The circular hub is coextensive with a hole through the mounting plate and defines an annular planar sealing surface which is stationary and surrounds a rotatable shaft leading from the machinery, with the annular planar sealing surface lying in a plane generally perpendicular to the rotating shaft. A rotatable seal ring is provided for surrounding the rotatable shaft and has an annular planar sealing surface for engaging and cooperating with the annular planar sealing surface of the stationary seal means to establish a seal therebetween. A collar is secured to the rotatable shaft for rotation therewith on the side of the rotatable seal ring opposite the stationary seal means defined by the hub and its annular planar sealing surface. The collar is fixed to the shaft by appropriate means, and a bearing plate is sandwiched between the collar and the seal ring.

The collar, bearing plate, and seal ring preferably are split to provide for in-place positioning about the shaft so as to permit easy initial assembly as well as to permit ready replacement, removal or repair of the sealing assembly without requiring the rotatable shaft or associated components to be stripped from the machinery or equipment with which it is used. The stationary mounting plate and the hub thereon which defines the stationary annular, planar sealing surface also may be split to provide for in-place positioning and mounting on the machinery or equipment without stripping the equipment or removal of the rotatable shaft.

A plurality of spring assemblies are mounted on the rotatable collar generally equidistant angularly thereabout for engaging the bearing plate and biasing the seal ring against the stationary seal means to effect engagement therebetween and to cause engagement between the annular planar sealing surface of the seal ring with the annular planar sealing surface of the stationary seal means. Each spring assembly includes a plunger, spring means for biasing the plunger against the bearing plate and, thus, the seal ring and means for adjusting the biasing force of the spring means against the bearing plate and seal ring. A bore is provided in the rotatable collar to define a recess for the plunger and the bore is threaded at least along a portion of the interior thereof for treadingly receiving an adjusting nut which has a head portion exposed exteriorly of the rotatable collar for adjusting rotation as by a wrench, screw driver or the like. The bore in the rotatable collar for each spring assembly extends generally parallel to the axis of the rotatable shaft, and the adjusting nut for each spring assembly has a recess in the inner end thereof coextensive with the bore and for receiving the plunger and spring means of the spring assembly.

The spring means for each adjustable spring assembly comprises a plurality of coaxial spring members of different spring coefficients. In the exemplary embodiment of the invention, the spring members include a first coil spring which engages the outer end of the plunger of the spring assembly and a second coil spring which engages the inside of the recess in the adjusting nut. The coil springs are axially aligned with the plunger by a rod member which has a transverse exterior flange defining shoulders against which opposing ends of the two coil springs abut. A sleeve member is disposed within the recess of the adjusting nut and surrounds the plunger and first coil spring and engages the flange of the rod member for coaxially aligning the plunger, rod member and coil springs. The first or inner coil spring has a lesser spring coefficient than the second or outer coil spring.

Other objects, features and advantages of the invention will be apparent from the following detailed description taken in connection with the accompanying drawings.

DESCRIPTION OF THE DRAWINGS

FIG. 1 is a side elevational view of the sealing assembly of the present invention mounted in place on a rotatable shaft between a pair of stationary elements, such as appropriate machinery;

FIG. 2 is an enlarged side elevational view of the spring assembly;

FIG. 3 is a fragmented vertical sectional view, on an enlarged scale, illustrating one of the adjustable spring assemblies of the present invention.

DETAILED DESCRIPTION OF THE INVENTION

Figure 4:
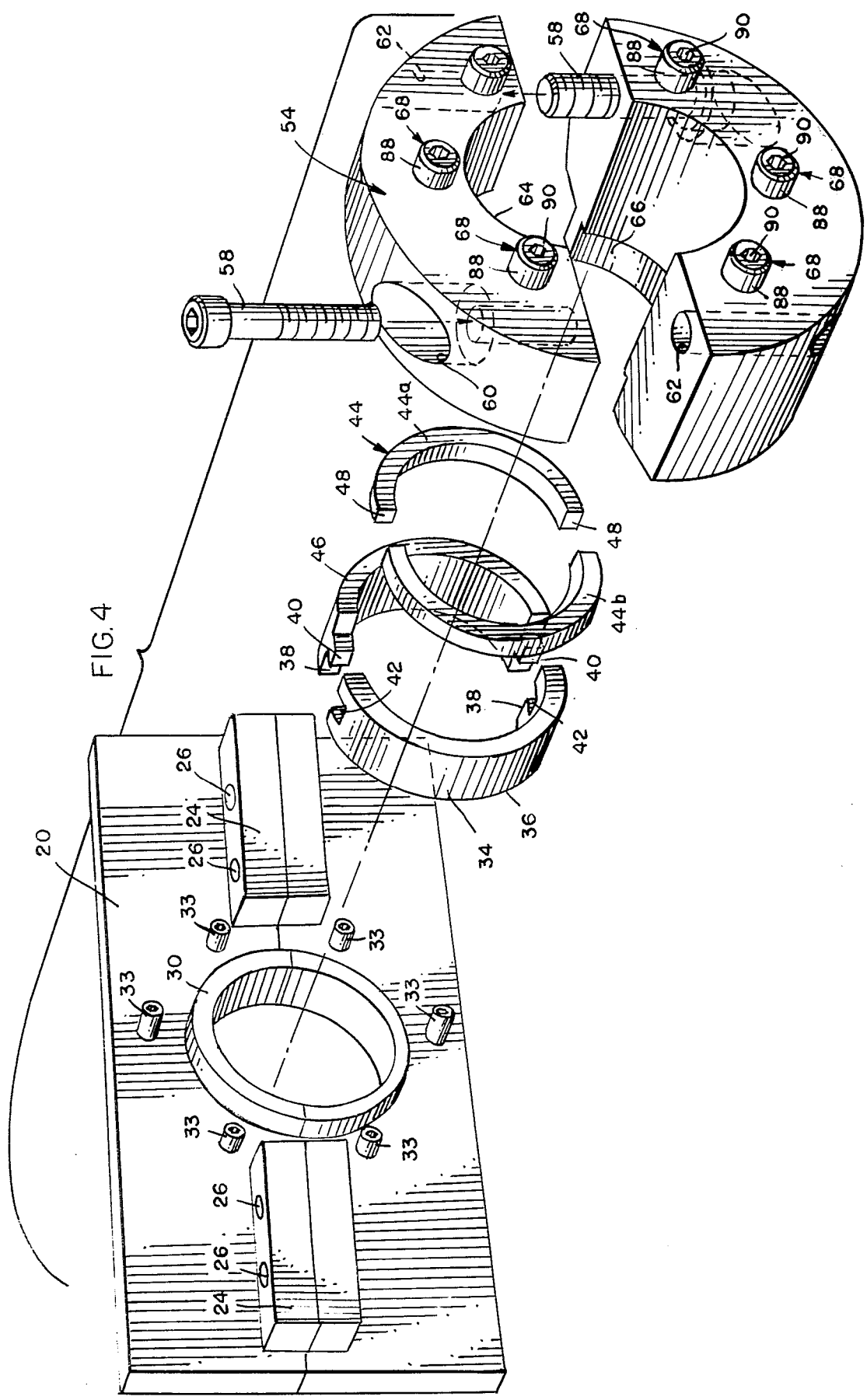
FIG. 4 is an exploded perspective view, on an enlarged scale, of the sealing assembly of the present invention.

Referring to the drawings in greater detail, the sealing assembly of the present invention is generally designated 10 in FIGS. 1, 2 and 4 and is provided for effecting a sealing joint between relatively rotatable elements which include a stationary element 12 (FIG. 1) and a rotatable shaft 14 which passes throught the stationary element 12. The stationary element 12 may comprise the housing of appropriate machinery, equipment or the like from which the rotatable shaft 14 protrudes toward a second element 16 (FIG. 1). The second element 16 may be any type of component which is stationary or rotatable with the shaft, but which is operatively associated with the shaft.

Stationary seal means, generally designated 18, (FIGS. 1, 2 and 4) is provided and includes a stationary plate 20 which is mounted on the wall or housing 12 (FIG. 1) of appropriate machinery or equipment with which the sealing assembly is to be utilized. The stationary plate 20 is split, as at 22 in FIG. 4, to provide in-place mounting about the shaft 14 without stripping the machinery or removing the shaft. A pair of brackets 24 are welded on or machined integral with the split plate 20 to secure the split halves of the plate together. Like the plate 20, the brackets 24 are split, as at 25, and shoulder bolts 26 secure the top and bottom halves of the brackets together, and thus secure the split halves of the stationary plate 20. A circular hub 28 is formed integral with or otherwise fixed to the stationary plate 20 and defines an annular planar sealing surface or face 30 surrounding the shaft 14 and lying in a plane generally perpendicular to the shaft. The hub 28 is split, as at 32 (FIG. 4), coextensive with the split halves of the stationary plate 20.

Bolts or screws 33 are provided in the stationary plate 20 with their head portions exposed on the front of the plate. These bolts or screws are provided for engaging the appropriate machinery, equipment or other structure to align the sealing face 30 of the hub 28 concentive with the shaft to be sealed.

The sealing assembly 10 includes rotatable seal means in the form of a circular sealing ring 34 (FIGS. 3 and 4) for surrounding the shaft 14. The sealing ring 34 has an annular planar sealing surface 36 (FIG. 4) for engaging and cooperating with the annular planar sealing surface 30 of the stationary hub 28 for effecting a seal therebetween. As seen in FIG. 4, the sealing ring 34 is split, as at seams 38, for in-place positioning about the shaft 14. The split halves of the sealing ring are mated by means of a tongue and groove construction which includes a pair of tongues 40 on one split half of the sealing ring and a pair of grooves 42 on the mating split half at the split seams 38 therebetween.

The sealing assembly 10 of the present invention also includes a backing plate 44, generally designated (FIGS. 3 and 4), which is circular and generally of the same size as the sealing ring 34. In assembly, the backing plate 44 bears against an outer annular surface 46 on the side of the sealing ring 34 opposite the annular sealing surface 36 thereof. As with the sealing ring, the backing plate 44 is split, as at 48 (FIG. 4) to provide split halves and 44a and 44b for in-place positioning about shaft 14. The backing plate 44 provides a pressure plate for bearing against the sealing ring 34 to bias the sealing ring against the hub 28 to effect engagement between the sealing surfaces 30 and 36 of the hub and sealing ring, respectively.

The sealing ring 34 may be fabricated of Teflon, carbide or the like and the backing plate 44 and/or the hub 28 may be fabricated of stainless steel or the like.

The sealing assembly 10 of the present invention further includes a rotatable collar, generally designated 54, which is split, as at 56 (FIG. 4) for in-place positioning about the shaft 14. The split halves of the collar 54 are mated together and secured about the shaft for rotation therewith by means of a pair of threaded bolts 58 which pass through counter-sunk bores 60 (FIG. 4) in one split half of the collar and threaded into bores 62 in the other split half thereof. The collar 54 rotates with the shaft 14 by means of a friction fit between the shaft and an axial bore 64 (FIG. 4) extending through the collar. The backing plate 44 and the sealing ring 34 are positioned axially of and concentric with the shaft 14 by means of a circular flange 66 (FIG. 4) which protrudes inwardly on the inside of the collar 54. The flange 66 is of a length so as to protrude inwardly into the hub 28. Thus, the hub 28, sealing ring 34 and bearing plate 44 are spaced from the shaft 14 the distance between the inside diameter of the bore 64 of the collar 54 and the inside diameter of the flange 66 of the collar.

A plurality of adjustable spring assemblies, generally designated 68, are mounted on or housed in the rotatable collar 54 for biasing the sealing ring 34 against the stationary sealing hub 28 to effect engagement of the cooperating annular planar sealing surfaces 30 and 36 of the hub and sealing ring, respectively. The spring assemblies 68 are spaced equidistant angularly about the hub 54 as best seen in FIG. 4 and, thus, about the rotating shaft 14 and actually bear against the circular backing plate or ring 44 as described in greater detail hereinafter. With this construction, the spring assemblies 68 provide means for adjusting the sealing pressure at various angular positions about the sealing joint of the sealing assembly 10 of the present invention to accommodate wear or deterioration of the sealing ring 34 as well as accommodate any variances in manufacturing the sealing ring, the hub 38, or the backing plate 44. The adjustment means provided by the spring assembly 68 also can accommodate any axial misalignment between the rotatable shaft 14 and the machinery or equipment 12 with which the shaft is associated while insuring a continuous seal about the sealing ring 34.

Referring to FIG. 3, each adjustable spring assembly 68 of the present invention includes a plunger 70 which bears at one end thereof against the bearing plate 44, as at 72, and which has an enlarged head or flange 74 at the opposite end of the plunger. The plunger 70 is disposed axially within a sleeve 76 which has a smaller diameter bore portion 78 within which the plunger is capable of reciprocating generally in the direction of arrow A (FIG. 3). The sleeve 76 also has a larger diameter bore portion 80 generally the same size as the head 74 of the plunger 70 for guiding the reciprocal movement of the plunger within the sleeve. The sleeve 76 is positioned within an elongated recess 82 in an adjustable nut 84 which is threaded, as at 86, into a threaded bore in the collar 54. The adjustable threaded nut 84 has a head portion 88 which is exposed exteriorly of the collar 54 so as to be capable of being rotated by a wrench, screw driver or the like. As shown in FIG. 3, the head 88 of the threaded nut 84 has a polygonal socket 90 for receiving an appropriate wrench.

Each adjustable spring assembly also includes spring means in the form of a pair of coaxial coil springs 92 and 94 which are effective for adjusting the biasing force against the bearing plate 44 and, in turn, the sealing ring 34. More particurlarly, as best seen in FIG. 3, a rod member 96 which is generally coaxial with the plunger 70 extends at one end thereof into the coil spring 92 and at the other end thereof into the coil spring 94. An intermediate enlarged flange 98 is formed on the rod member 96 for sliding movement of the rod member as it is guided within the enlarged diameter bore portion 80 of the sleeve 76, along with the plunger 70 generally in the direction of double headed arrow A (FIG. 3). The coil spring 94 seats within a recess 199 formed within the inside of the head 88 of the adjusting nut 84. The coil spring 92 has a lesser spring coefficient than the coil spring 94. It has been found in practice that this differential in spring coefficients between the coil springs 92, 94 not only effects a better adjustable biasing force against the sealing ring 34 but also provides for a wider range of adjustment.

Although not shown in the drawings, purge holes can be provided in the collar for lubricating the shaft without disturbing the sealing assembly of the present invention.

Thus, it can be seen that a new and improved sealing assembly has been provided for effecting a sealing joint between relatively rotatable elements such as the stationary element 12 (FIG. 1) and a rotating element such as the rotating shaft 14 which extends between the stationary element 12 and a second stationary or rotatable component 16 (FIG. 1) with which the shaft is operatively associated.

While in the foregoing specification a detailed description of the invention has been set forth for purposes of illustration, it will be appreciated by those skilled in the art that the details herein given may be varied without departing from the spirit and scope of the invention.

I claim:
1. A sealing assembly for effecting a sealing joint between relatively rotatable elements which include a stationary element and a rotatable shaft passing through said stationary element, comprising:

stationary seal means defining an annular sealing surface fixed on said stationary element and surrounding said shaft;

rotatable seal ring means surrounding said shaft and having an annular sealing surface for engaging and cooperating with said annular sealing surface of said stationary seal means to establish a seal therebetween;

a rotatable collar secured to said shaft for rotation therewith on the side of said rotatable seal ring means opposite said stationary seal means, said collar including a recess opening inwardly toward said seal ring means and an outwardly opening, exposed threaded bore which is axially co-extensive with said recess; and at least one adjustable spring assembly mounted on said collar for biasing said seal ring means against said stationary seal means to effect engagement of said cooperating annular sealing surfaces, said spring assembly including a plunger disposed in said recess in said collar, a nut threaded into said bore in said collar and exposed outwardly thereof for threading adjustment in said bore, said nut including a recess opening toward said seal ring means, and spring means for biasing said plunger toward said seal ring means, said spring means being positioned within said recess in said nut and bearing at one end thereof against said plunger and at the other end thereof against said threaded nut on the inside of said recess, whereby threaded adjustment of said nut within said bore in said collar readily adjusts the biasing force of said spring means.

2. The sealing assembly of claim 1 including an elongated positioning sleeve within said recess surrounding said plunger and said spring means.

3. The sealing assembly of claim 1 wherein said collar is split to provide for in-place positioning about said shaft, and including at least one of said spring assemblies on each split half of said collar.

4. The sealing assembly of claim 1 wherein said rotatable seal ring means comprises a split ring for in-place positioning about said shaft, and including at least one of said spring assemblies on said collar for each split half of said seal ring means.

5. The sealing assembly of claim 1 including an annular bearing plate positioned between said collar and said seal ring means, said spring assembly being engageable with said bearing plate to bias the bearing plate against said seal ring means.

6. The sealing assembly of claim 5 wherein said bearing plate comprises a split plate, and including at least one of said spring assemblies on said collar for each split half of said bearing plate.

7. The sealing assembly of claim 1 wherein each of said collar and said rotatable seal ring means is split to provide for in-place positioning about said shaft, and including at least one of said spring assemblies on each split half of said collar.

8. The sealing assembly of claim 15 including an annular bearing plate positioned between said collar and said seal ring means, said spring assemblies being engageable with said bearing plate to bias the bearing plate against said seal ring means.

9. The sealing assembly of claim 8 wherein said bearing plate comprises a split plate, and including at least one of said spring assemblies on said collar for each split half of said bearing plate.

10. The sealing assembly of claim 1 including a plurality of said spring assemblies equally spaced angularly about said collar.

11. The spring assembly of claim 1 wherein said stationary seal means comprises a support plate and a circular hub formed integral with said support plate and protruding outwardly therefrom through which said shaft protrudes, with an annular sealing surface on said hub.

12. The sealing assembly of claim 1 wherein said spring means comprises a plurality of coaxial spring members of different spring coefficients.

13. The sealing assembly of claim 12 where one of said spring members closer to said seal ring means has a lesser spring coefficient than another of said spring members.

14. The sealing assembly of claim 12 wherein said spring means comprises a first spring member engageable with said plunger, a second spring member effectively biased against said collar, and an abutment member disposed between said first and second spring members.

15. The sealing assembly of claim 14 wherein said nut is engageable with said second spring member.

16. The sealing assembly of claim 15 wherein said spring members comprise coil springs, and said abutment member is a rod extending at opposite ends thereof into said coil springs and having an outwardly protruding flange defining shoulders on opposite sides thereof engageable with said coil springs.

17. The sealing assembly of claim 11 wherein said spring members are coil springs.

18. A sealing assembly for effecting a sealing joint between relatively rotatable elements which include a stationary element and a rotatable shaft passing through said stationary element, comprising:

means defining an annular sealing surface on said stationary element surrounding said shaft;

rotatable seal means surrounding said shaft and having an annular sealing surface for engaging and cooperating with the annular surface of said stationary seal means to establish a seal therebetween;

a rotatable collar secured to said shaft for rotation therewith on the side of said rotatable seal means opposite said stationary seal means; and at least one spring assembly biased between said collar and said rotatable seal means, said spring assembly including a plurality of coaxial spring members of different spring coefficients.

19. The sealing assembly of claim 18 including means for adjusting the biasing force of said spring assembly against said rotatable seal means.

20. The sealing assembly of claim 18 wherein one of said spring members closer to said rotatable seal means has a lesser spring coefficient than another of said spring members.

21. The sealing assembly of claim 18 wherein said spring members are coil springs and including coaxial rod means extending into said coil springs to maintain the coil springs in coaxial alignment.

22. The sealing assembly of claim 21 wherein one of said spring members closer to said rotatable seal means has a lesser spring coefficient than another of said spring members.

23. The sealing assembly of claim 21 including means for adjusting the biasing force of said spring assembly against said rotatable seal means.

24. The sealing assembly of claim 18 including a recess in said collar opening toward said rotatable seal means, said spring means being disposed within said recess.

25. The sealing assembly of claim 24 including means for adjusting the biasing force of said spring assembly against said rotatable seal means.

26. The sealing assembly of claim 24 including a recess in said collar opening toward said rotatable seal means, said spring assembly being disposed within said recess, and an adjusting nut threaded into a bore in said collar and effectively associated with said spring assembly for adjusting the biasing force of said spring assembly against said seal means.

27. The sealing assembly of claim 26 wherein said recess and said bore are coextensive.

* * * * *

UNITED STATES PATENT OFFICE
CERTIFICATE OF CORRECTION

Patent No. 4,215,870                    Dated August 5, 1980

Inventor(s) Jesse W. Escue

It is certified that error appears in the above-identified patent and that said Letters Patent are hereby corrected as shown below:

Column 6, line 66, after "claim" delete "15" and insert -- 7 --.

Column 7, line 33, after "claim" delete "15" and insert -- 14 --.

Column 7, line 39, after "claim" delete "11" and insert -- 12 --.

Signed and Sealed this

Eighteenth Day of November 1980

[SEAL]

Attest:

SIDNEY A. DIAMOND

Attesting Officer          Commissioner of Patents and Trademarks